3,251,804
POLY(PHENYLENE/4,4'-DIPHENYLENEISOPRO-
PYLIDENE HEXAHYDROTEREPHTHALATE)
William H. Watson, Grifton, N.C., assignor to E. I. du
Pont de Nemours and Company, Wilmington, Del., a
corporation of Delaware
No Drawing. Filed Feb. 9, 1962, Ser. No. 172,120
5 Claims. (Cl. 260—47)

This invention relates to new aromatic copolyesters and to products formed therefrom.

In recent years attempts have been made to develop synthetic fibers from which can be made garments which are relatively free from wrinkling after laundering, so that little or no ironing of the garments is required. Fabrics adaptable for making garments of this type, requiring only simple care, are frequently characterized as "wash-and-wear" fabrics. In general, the fiber properties desired for making such fabrics have been most closely approached, among the commercial fibers, by poly(ethylene terephthalate). A large number of other synthetic linear condensation polyester fibers have been investigated in an effort to obtain still more desirable properties. Prior to the present invention, however, each of the polyester fibers evaluated which has exhibited improvement in wash-and-wear properties has also possessed deficiencies in one or more aspects important for commercial acceptance.

A fiber which does not have good stability to common cleaning agents or light, either outdoors or indoors, will not be satisfactory for garment uses even though it may be superior in other respects. An example is fibers of poly(4,4'-diphenyleneisopropylidene hexahydroterephthalate), the homopolyester derived from diphenylolpropane and hexahydroterephthalic acid. Fabrics composed of this polyester fiber exhibit high recovery from tensile stress and give superior performance in "wash-and-wear" garments; moreover, they have a high degree of stability when exposed to light, either outdoors or indoors. Unfortunately, however, the fibers are affected by dry cleaning solvents, apparently owing to the fact that only a relatively low order of crystallinity can be built into these fibers.

It is an object of this invention to provide a novel copolyester and fibers prepared therefrom characterized by insensitivity to common solvents as well as high recovery from tensile stress and good performance in "wash-and-wear" fabrics. Other objects will become apparent from the following description and claims.

I have found that the desired properties can be obtained from a novel copolyester derived from hexahydroterephthalic acid and a mixture of diphenylolpropane and hydroquinone. More specifically, the invention comprises a novel linear copolyester formed from reactants consisting essentially of (a) hexahydroterephthalic acid and (b) a mixture of the dihydroxy compounds preferably in the proportions of 75 to 25 mol percent diphenylolpropane and 25 to 75 mol percent hydroquinone, the mol percentages of said dihydroxy compounds totaling 100 mol percent. For production of fibers, said polyester has an intrinsic viscosity, measured in solution at 25° C. in 1 part by volume of trifluoroacetic acid and 3 parts by volume of methylene chloride, of at least 0.3. Also contemplated in accordance with the invention are fibers, films, and other shaped articles of outstanding properties prepared from the novel copolyester.

Alternately, the novel copolyester is characterized as a linear polymer consisting essentially of a succession of recurring structural units represented by the formulas

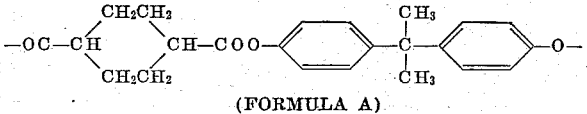

(FORMULA A)

and 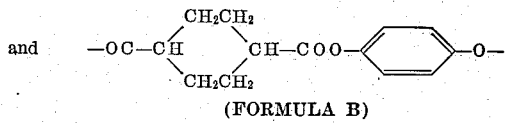

(FORMULA B)

wherein the ratio of said units (Formulas A and B) is preferably in the range of 75/25 to 25/75, respectively.

The copolyesters of the invention are preferably prepared by reacting hexahydroterephthalic acid with a mixture of diphenylolpropane diacetate and hydroquinone diacetate at elevated temperatures in the presence of a catalyst such as sodium acetate. This reaction may be modified in various ways in accordance with known technology for forming polyesters; e.g., if desired, the diphenylolpropane diacetate and/or hydroquinone diacetate may be formed in situ by adding diphenylolpropane and/or hydroquinone and acetic anhydride to the starting material reaction mixture. Other esterification methods may be employed to form the polymer, e.g., by reacting a mixture of diphenylolpropane and hydroquinone with diphenyl hexahydroterephthalate in the presence of sodium acetate as a catalyst. Another method is to add a solution of hexahydroterephthaloyl chloride in an organic solvent such as 1,1,2-trichloroethane to a rapidly stirred solution of diphenylolpropane and hydroquinone in aqueous sodium hydroxide.

As used herein, the term "diphenylolpropane" refers to the compound otherwise known as 2,2-bis(4-hydroxyphenyl)propane. The term "hexahydroterephthalic acid" refers to the compound otherwise known as 1,4-cyclohexanedicarboxylic acid. Hexahydroterephthalic acid has been isolated in two forms, cis- and trans-. In the preparation of polyesters from this acid and the diacetates of diphenylolpropane and hydroquinone, however, it has been observed that equilibration between the cis- and trans-forms occurs in the molten reaction mixture and that the polyester therefore contains a mixture of the two forms no matter whether the pure cis-form, the pure trans-form, or a mixture of the forms is employed as the starting material in the reaction.

While the novel copolyester of the invention consists essentially of repeating structural units composed of hexahydroterephthalate esters of diphenylolpropane and hydroquinone, relatively small amounts of other copolymeric repeating structural units may be present to modify the properties of the polymer. For example, a mixture of 0.5 mol of diphenylolpropane and 0.5 mol of hydroquinone may be reacted with 0.97 mol of diphenyl hexahydroterephthalate and 0.03 mol of sodium 3,5-di(phenoxycarbonyl)benzenesulfonate to form a sulfonate-modified copolyester which is readily dyeable with basic dyes. Similarly, 0.03 mol of sodium diphenyl trimesate may be substituted in place of the sodium 3,5-di(phenoxycarbonyl) benzenesulfonate to form a basically dyeable, modified copolyester. Similar minor modifications of the copolyester, in which the copolyester remains essentially comprised of repeating structural units of hexahydroterephthalate esters of diphenylolpropane and hydroquinone, will be apparent to those skilled in the art.

The term "intrinsic viscosity," as used herein, is defined as the limit of the fraction $$\frac{\ln(r)}{c}$$

as $c$ approaches 0, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C.

Intrinsic viscosity is a measure of the degree of polymerization.

The ability of a fiber or yarn to recover from low levels of extension, as measured by its modified tensile strain recovery (MTSR), has been found to correlate well with its wash-and-wear performance in the form of fabrics prepared from the yarn. The MTSR of a yarn sample is determined by mounting a 10-inch length of the yarn on a tensile tester (commercially available from the Instron Engineering Corp., Quincy, Mass.). The yarn sample is initially dried on the tensile tester in a slack condition for 4 minutes at 80° C., cooled for 1 minute, immersed in a water bath maintained at 40° C. for a period of 2 minutes, and subsequently stretched in the water bath at an elongation rate of 1 inch per minute. Upon reaching the desired total elongation, the sample is held at constant length for an additional 2 minutes and the water bath is removed. The load on the yarn is then reduced to a value of 0.042 g.p.d. and the yarn is allowed to retract while again being dried at a temperature of 80° C. for 4 minutes; the heater is then removed and the yarn cooled for an additional 1 minute, after which the final length of the yarn is measured. Percent recovery is calculated from the formula:

$$\frac{\text{Units of retraction}}{\text{Units of elongation}} \times 100$$

This procedure is carried out for elongations of 0.5, 1, 2, and 3%, and a graph is prepared by plotting the percent recovery against total elongation in the range 0–3%. MTSR values are average percent recovery values from the range 0–3% elongation which may be determined from the graph by usual graphical averaging procedures.

In rating yarns for tensile recovery using the MTSR parameter, a value of 70% is considered good.

Sonic velocity measurements referred to herein with respect to yarns or fibers are a measure of the degree of molecular orientation of the polymer of which the yarn is composed. Specific values refer to measurements made in accordance with the method of Church and Moseley, Textile Research Journal, volume 29, page 525 (July 1959).

The following examples, which illustrate the preparation of the novel copolyester of the invention as well as the desirable properties thereof, will serve to illustrate the invention. However, the examples are not intended to be limitative.

*Example I*

A charge consisting of 31.2 g. (0.1 mol) of diphenylolpropane diacetate, 19.4 g. (0.1 mol) of hydroquinone diacetate, 34.7 g. (0.202 mol) of hexahydroterephthalic acid, and 0.16 g. (0.002 mol) of sodium acetate catalyst is placed in a reaction flask fitted with a nitrogen inlet, stirrer, distilling head, and heating bath. The apparatus is swept out with nitrogen and then heated to 250° C. to melt the contents. Evolution of acetic acid begins almost immediately after the ingredients become molten and is continued under a constant stream of nitrogen until about 80–85% of the theoretical amount of acetic acid is distilled out. The flask is then removed from the bath, cooled, and the polymer removed. The product, poly(phenylene/4,4'-diphenyleneisopropylidene hexahydroterephthalate) (50/50) is a white, brittle solid having an intrinsic viscosity of about 0.3 and a polymer melting temperature of 180° C. The "polymer melting temperature" is the gross melting temperature determined by heating a polymer sample slowly and observing the lowest temperature at which light pressure causes permanent deformation of the sample.

The polymeric material prepared as described above is powdered and then heated for 6 hours under a stream of nitrogen while the temperature is gradually increased from 180° C. to 280° C. At the conclusion of this solid phase polymerization reaction, the intrinsic viscosity of the polymer is 0.8 and the polymer melting temperature is 280° C.

A molten sample of the polymer is spun into filaments, using conventional techniques. The spun filaments are found to be both oriented and crystalline, as determined by interpretation of X-ray diffraction patterns, and they are found to have a sonic velocity value of 1.3 KM/sec. by the reference Charch and Moseley method of measurement. The spun filaments are heat-treated by boiling them in water for 15 minutes, heating them in an oven at 180° C. for 3 minutes, and finally immersing them in boiling water again for 15 minutes. The heat-treated filaments have an MTSR of 72%. They are insoluble in perchloroethylene and trichloroethylene and are virtually unaffected even by methylene chloride.

In a comparative control experiment, the hexahydroterephthalate polyester of diphenylolpropane is prepared in the absence of hydroquinone by repeating the above experiment, substituting 62.4 g. (0.2 mol) of diphenylolpropane diacetate for the mixture of diphenylolpropane diacetate and hydroquinone diacetate used above. After completing the melt polymerization reaction and solid phase polymerization reaction, a polymeric product having a polymer melt temperature of 250° C. is obtained. Filaments spun from the polymer have a sonic velocity value of 1.1KM/sec. After a three-stage heat treatment as described above, the filaments have an MTSR of 74% and are insoluble in perchloroethylene; however, they dissolve quickly in both methylene chloride and trichlorethylene.

In another comparative control experiment, the hexahydroterephthalate polyester of hydroquinone is prepared in the absence of diphenylolpropane, repeating the experiment as described above using 38.8 g. (0.2 mol) of hydroquinone diacetate in place of the mixture of diphenylolpropane diacetate and hydroquinone diacetate. After completing the melt polymerization reaction and the solid phase polymerization reaction, a highly crystalline, insoluble polyester is obtained. The polyester is infusible at temperatures up to 400° C., and it is impracticable to prepare filaments from the polyester by melt-spinning techniques.

*Example II*

In a three-neck flask fitted with a stirrer, nitrogen inlet, heating bath, and distilling head is placed 29.13 g. (0.150 mol) of hydroquinone diacetate, 11.41 g. (0.050 mol) of diphenylolpropane, 34.74 g. (0.202 mol) of hexahydroterephthalic acid, 11 ml. of acetic anhydride, and, as a catalyst, 0.13 g. of sodium acetate. The charge is polymerized by heating under a nitrogen atmosphere with stirring according to the following cycle:

| Time (minutes) | Temperature (° C.) | Pressure |
| --- | --- | --- |
| 0 to 15 | 180 | Atm. |
| 15 to 75 | 225–235 | Atm. |
| 75 to 90 | 265–270 | Atm. |
| 90 to 120 | 290–300 | Atm. |
| 120 to 150 | 330 | 1.0 mm. Hg. |

The molten polymer, poly(phenylene/4,4'-diphenyleneisopropylidene hexahydroterephthalate) (75/25), is clear and viscous. Cold drawable fibers can be pulled from the melt. The intrinsic viscosity of the polymer is about 0.4 and the polymer melting temperature is 323° C.

Following a similar procedure, poly(phenylene/4,4'-diphenyleneisopropylidene hexahydroterephthalate) (60/40) having an intrinsic viscosity of about 0.4 is prepared by changing the proportions of hydroquinone diacetate, diphenylolpropane, and acetic anhydride in the above description to 23.30 g. (0.120 mol), 18.25 g. (0.080 mol) and 18 ml., respectively.

Another experiment is performed by a similar procedure, using 9.71 g. (0.050 mol) of hydroquinone diacetate, 34.23 g. (0.150 mol) of diphenylolpropane, 33 ml. of acetic anhydride, and other reactants in the same quantities given above. The product, poly(phenylene/4,4'-diphenyleneisopropylidene hexahydroterephthalate) (25/75), has an intrinsic viscosity of about 0.4 and a polymer melting temperature of 305° C.

Since many different embodiments of the invention may be made without departing from the spirit and scope thereof, it is to be understood that the invention is not limited by the specific illustrations except to the extent defined in the following claims.

I claim:

1. The linear copolyester having an intrinsic viscosity of at least 0.3, measured in solution at 25° C. in 1 part by volume of trifluoroacetic acid and 3 parts by volume of methylene chloride, the copolyester having a polymer melting temperature of 280° to 323° C. and consisting essentially of poly(phenylene/4,4'-diphenyleneisopropylidene hexahydroterephthalate) wherein the mol ratio of phenylene to diphenyleneisopropylidene is within the range of 75/25 to 25/75.

2. The copolyester as defined in claim 1 wherein the copolyester consists essentially of a succession of structural units represented by the formulas

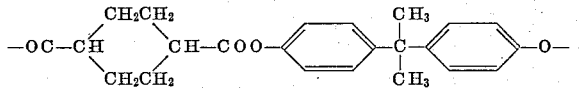

and

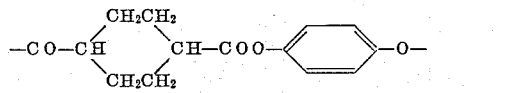

the relative ratio of said units being within the range of 75/25 to 25/75.

3. Fibers of a linear copolyester having an intrinsic viscosity of at least 0.3, measured in solution at 25° C. in 1 part by volume of trifluoroacetic acid and 3 parts by volume of methylene chloride, said copolyester having a polymer melting temperature of 280° to 323° C. and consisting essentially of poly(phenylene/4,4'-diphenyleneisopropylidene hexahydroterephthalate) wherein the mol ratio of phenylene to diphenyleneisopropylidene is within the range of 75/25 to 25/75.

4. Fibers as defined in claim 3 wherein the said copolyester is composed of recurring structural units represented by the formulas

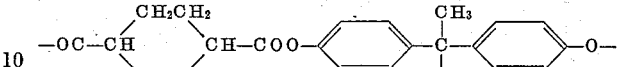

and

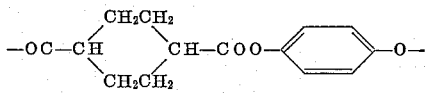

the relative ratio of said units being within the range of 75/25 to 25/75.

5. Fibers as defined in claim 3 wherein said copolyester is a hexahydroterephthalate polyester of substantially equal mol proportions of diphenylolpropane and hydroquinone, and is further characterized by having a polymer melting temperature of about 280° C. and by being insoluble in perchloroethylene and trichloroethylene.

References Cited by the Examiner
UNITED STATES PATENTS

| | | | |
|---|---|---|---|
| 2,035,578 | 3/1936 | Wagner | 260—47 |
| 3,110,547 | 12/1963 | Emmert | 260—75 |
| 3,143,526 | 8/1964 | Caldwell et al. | 260—47 |

FOREIGN PATENTS

| | | |
|---|---|---|
| 588,783 | 12/1960 | Belgium. |
| 1,175,362 | 11/1958 | France. |

WILLIAM H. SHORT, *Primary Examiner.*

LOUISE P. QUAST, *Examiner.*